(12) United States Patent
Park et al.

(10) Patent No.: US 7,304,700 B2
(45) Date of Patent: Dec. 4, 2007

(54) LIQUID CRYSTAL DISPLAY DEVICE AND METHOD FOR FABRICATING THE SAME

(75) Inventors: Jong Jin Park, Anyang-shi (KR);
Hyeon Ho Son, Anyang-shi (KR);
Heume Il Baek, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 393 days.

(21) Appl. No.: 10/997,961

(22) Filed: Nov. 29, 2004

(65) Prior Publication Data

US 2005/0122445 A1 Jun. 9, 2005

(30) Foreign Application Priority Data

Dec. 4, 2003 (KR) .................... 10-2003-0087560

(51) Int. Cl.
*G02F 1/1335* (2006.01)

(52) U.S. Cl. ................ 349/106; 349/141; 349/110

(58) Field of Classification Search ............. 349/106, 349/108, 187, 109, 110, 111, 141, 139, 143; 353/84, 97; 352/42

See application file for complete search history.

(56) References Cited

U.S. PATENT DOCUMENTS

| | | | |
|---|---|---|---|
| 4,828,365 A | | 5/1989 | Stewart et al. |
| 5,642,176 A | | 6/1997 | Abukawa et al. |
| 5,695,690 A | * | 12/1997 | Swirbel et al. ............. 252/582 |
| 5,757,452 A | * | 5/1998 | Masaki et al. ............. 349/110 |
| 5,899,550 A | * | 5/1999 | Masaki ....................... 349/109 |
| 6,816,222 B2 | * | 11/2004 | Ono et al. .................. 349/143 |
| 2003/0043318 A1 | | 3/2003 | Kim |
| 2004/0263748 A1 | * | 12/2004 | Park et al. .................. 349/141 |

FOREIGN PATENT DOCUMENTS

| | | |
|---|---|---|
| JP | 2644614 B2 | 5/1992 |
| KR | 0186818 | 12/1998 |
| KR | 10-2001-30523 A | 4/2001 |
| KR | 10-2002-0008794 A | 1/2002 |
| KR | 10-2002-0091457 | 12/2002 |

\* cited by examiner

*Primary Examiner*—Thoi V. Duong
(74) *Attorney, Agent, or Firm*—McKenna Long & Aldridge LLP

(57) ABSTRACT

A LCD device and a method for fabricating the same is disclosed that decreases the fabrication time of the LCD device by obtaining a white color in a fourth pixel region using first, second, and third auxiliary color filter layers, and improve the resolution for the white color by controlling the width of the auxiliary color filter layers. The device includes first and second substrates having first, second, third and fourth pixel regions arranged repetitively; a black matrix layer formed on the second substrate corresponding to portions of the substrates other than the pixel regions; first, second and third color filter layers respectively formed on the first, second, and third pixel regions of the second substrate; first, second, and third auxiliary color filter layers formed on the fourth pixel region of the second substrate to display a white color; and a liquid crystal layer formed between the first and second substrates.

8 Claims, 11 Drawing Sheets

(a)                      (b)

LIQUID CRYSTAL DISPLAY DEVICE AND METHOD FOR FABRICATING THE SAME

This application claims the benefit of the Korean Application No. P2003-87560, filed on Dec. 4, 2003, which is hereby incorporated by reference for all purposes as if fully set forth herein.

BACKGROUND OF THE INVENTION

1. Field of the Invention

The present invention relates to a liquid crystal display (LCD) device, and more particularly, to a liquid crystal display (LCD) device to improve the resolution for a white color and a method for fabricating the same.

2. Discussion of the Related Art

Demands for various display devices have increased with the development of an information-based society. Accordingly, many efforts have been made to research and develop various flat display devices such as liquid crystal display (LCD), plasma display panel (PDP), electroluminescent display (ELD), and vacuum fluorescent display (VFD). Some species of flat display devices have already been applied to displays for various equipment.

Among the various flat display devices, liquid crystal display (LCD) devices have been most widely used due to advantageous characteristics of thin profile, lightness in weight, and low power consumption. In addition to mobile type displays, LCD devices have been developed for computer monitors and televisions to receive and display broadcasts.

The LCD device includes first and second substrates bonded to each other at a predetermined interval, and a liquid crystal layer formed between the first and second substrates. The first substrate (TFT array substrate) includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions defined by crossings of the gate and data lines, and a plurality of thin film transistors for transmitting signals from the data lines to the pixel electrodes. The second substrate (color filter array substrate) includes a black matrix layer that prevents light from leaking on portions of the first substrate except the pixel regions, an R/G/B color filter layer for displaying various colors, and a common electrode for producing the image. The first and second substrates are bonded together by a sealant, and liquid crystal is injected between the first and second substrates. Alignment layers are respectively formed on opposing surfaces of the first and second substrates, wherein the alignment layers are rubbed to align the liquid crystal layer.

Herein, the color filter layer of the second substrate is comprised of unit pixels including three sub-pixels, wherein the three sub-pixels are formed of R(red), G(green), and B(blue) colors. Recently, to improve luminance of the image displayed on the LCD panel, the unit pixel may include four sub-pixels. That is, in addition to the sub-pixels of R, G, and B colors, a sub-pixel of a white (W) color may be included, so that the unit pixel may be comprised of the sub-pixels of R, G, B, and W colors.

A related art color filter substrate using a color filter layer of R, G, B, and W will be described with reference to the accompanying drawings.

FIG. 1 is a schematic view of a related art color filter substrate. FIG. 2 is a cross sectional view of a related art color filter substrate along I-I' of FIG. 1.

As shown in FIG. 1 and FIG. 2, a related art color filter substrate includes a substrate 10, a black matrix layer BM, first to fourth color filter layers 11a, 11b, 11c, 11d, and an overcoat layer 12. First to fourth pixel regions are repetitively formed on the substrate 10, and the black matrix layer BM is formed on an entire surface of the substrate 10, except the pixel regions, to prevent light leakage on the portions other than the pixel regions. Also, the first, second, third, and fourth color filter layers 11a, 11b, 11c, 11d are formed on the respective pixel regions, and the overcoat layer 12 is formed on the entire surface of the substrate 10 including the respective color filter layers 11a, 11b, 11c, 11d.

Herein, the first, second, and third color filter layers 11a, 11b, 11c are formed of dyed resist or resin. That is, the first, second, and third color filter layers 11a, 11b, 11c are respectively formed of red-dyed, green-dyed, and blue-dyed resist or resin to display the respective colors. The fourth color filter layer 11d is formed of transparent resist or resin having no pigment to improve luminance by transmitting the incident light.

A method for fabricating the related art color filter substrate will be described as follows.

FIG. 3A to FIG. 3C are cross sectional views of the fabrication process of a related art color filter substrate along I-I' of FIG. 1.

First, as shown in FIG. 3A, after preparing the substrate 10 having the first to fourth pixel regions repetitively arranged, chrome or resin is deposited on the substrate 10, and then is patterned by photolithography. As a result, the black matrix layer BM is formed on the entire surface of the substrate 10 including the respective pixel regions.

Subsequently, as shown in FIG. 3B, the red resist or resin is coated on the substrate 10 having the black matrix layer BM, and then the substrate 10 coated with the red resist or resin is patterned by photolithography, thereby forming the first color filter layer 11a on the first pixel region of the substrate 10.

Next, as shown in FIG. 3C, the green resist or resin is coated on the substrate 10 having the first color filter layer 11a, and then the substrate 10 is patterned by photolithography, thereby forming the second color filter layer 11b on the second pixel region of the substrate 10.

After that, the blue resist or resin is coated on the substrate 10 having the first and second color filter layers 11a, 11b, and then the substrate 10 is patterned by photolithography, thereby forming the third color filter layer 11c on the third pixel region of the substrate 10.

Subsequently, the transparent resist is coated on the substrate 10 having the first, second, and third color filter layers 11a, 11b, 11c, and then the substrate 10 coated with the transparent resist is patterned by photolithography, thereby forming the fourth color filter layer 11d on the fourth pixel region of the substrate 10.

Then, the overcoat layer 12 is formed on the entire surface of the substrate 10 including the first, second, third, and fourth color filter layers 11a, 11b, 11c, 11d, thereby completing the fabrication process of the color filter substrate.

However, the related art color filter substrate using the R, G, B, and W color filter layers has the following disadvantages.

In the related art fabrication process of the color filter substrate, in order to form the white color filter layer, it requires additional process steps of coating the transparent resist on the substrate, and etching the substrate coated with the transparent resist by photolithography, thereby increasing the fabrication time, and decreasing the yield.

Also, there is a difference of resolution between the white color obtained by the white color filter layer of the color filter substrate, and the white color obtained by the R, G, and B color filter layers of the other pixel regions, thereby deteriorating the entire color resolution for the white color.

SUMMARY OF THE INVENTION

Accordingly, the present invention is directed to a liquid crystal display (LCD) device and a method for fabricating the same that substantially obviates one or more problems due to limitations and disadvantages of the related art.

An advantage of the present invention is to provide a liquid crystal display (LCD) device and a method for fabricating the same to improve the resolution for a white color of a LCD device, and to simplify the fabrication process.

Additional advantages and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display (LCD) device includes first and second substrates having first, second, third and fourth pixel regions arranged repetitively; a black matrix layer formed on the second substrate corresponding to the portions of the substrates other than the pixel regions; first, second and third color filter layers respectively formed on the first, second, and third pixel regions of the second substrate; first, second, and third auxiliary color filter layers formed on the fourth pixel region of the second substrate to display a white color; and a liquid crystal layer formed between the first and second substrates.

In another aspect of the present invention, a method for fabricating an LCD device includes preparing first and second substrates having first, second, third and fourth pixel regions arranged repetitively; forming a black matrix layer on the second substrate corresponding to portions of the substrates other than the pixel regions; forming a first color filter layer on the first pixel region of the second substrate, and a first auxiliary color filter layer on the fourth pixel region, simultaneously; forming a second color filter layer on the second pixel region of the second substrate, and a second auxiliary color filter layer on the fourth pixel region, simultaneously; forming a third color filter layer on the third pixel region of the second substrate, and a third auxiliary color filter layer on the fourth pixel region, simultaneously; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, an LCD device according to the present invention and a method for fabricating the same will be described with reference to the accompanying drawings.

Figure 1:
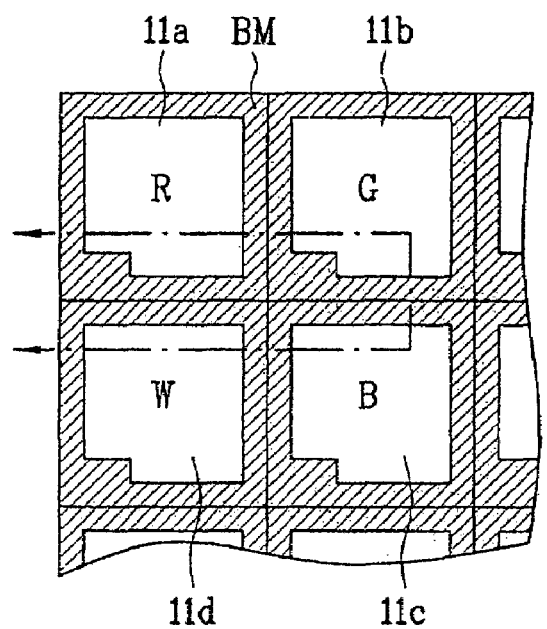
FIG. 1 is a schematic view of a related art color filter substrate.
Figure 2:
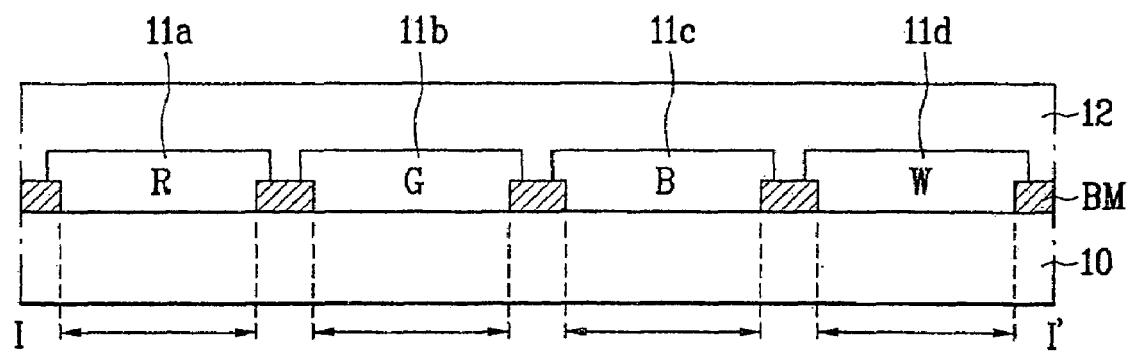
FIG. 2 is a cross sectional view of a related art color filter substrate along I-I' of FIG. 1.
Figure 3A:
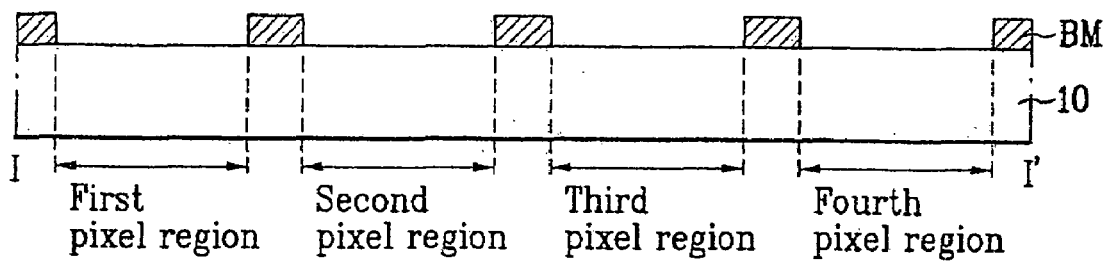
FIG. 3A to FIG. 3C are cross sectional views of the fabrication process of a related art color filter substrate along I-I' of FIG. 1.
Figure 3B:
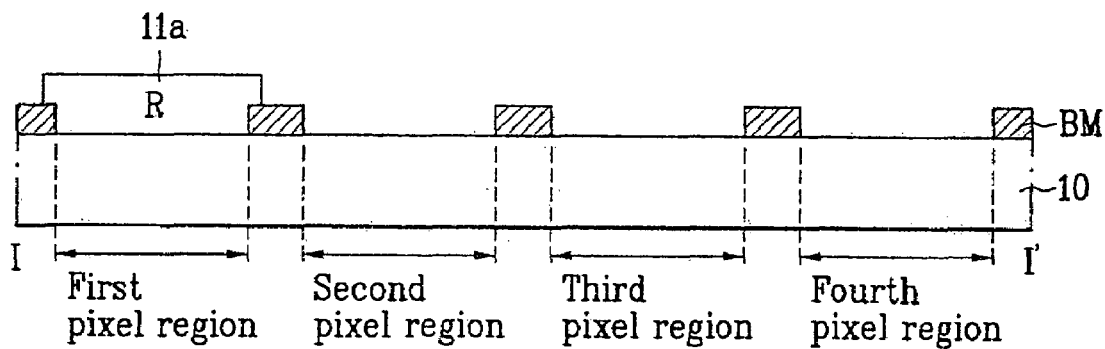
Figure 3C:
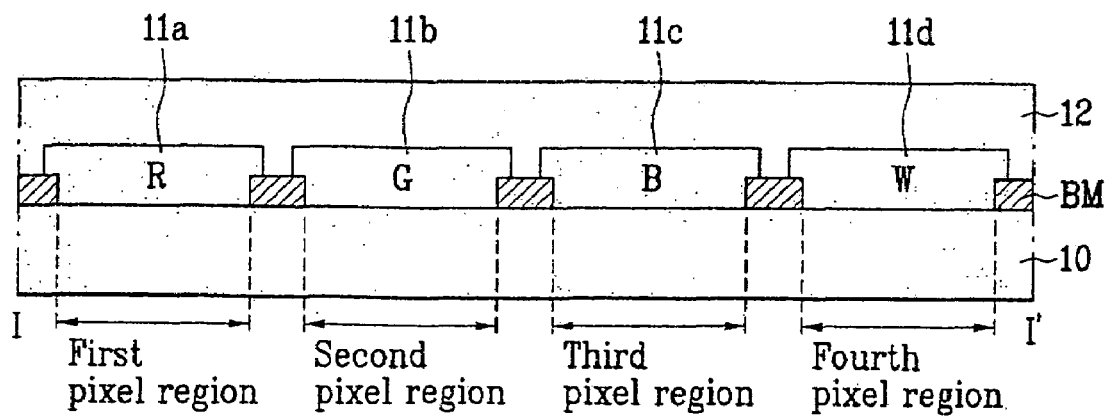
Figure 4:
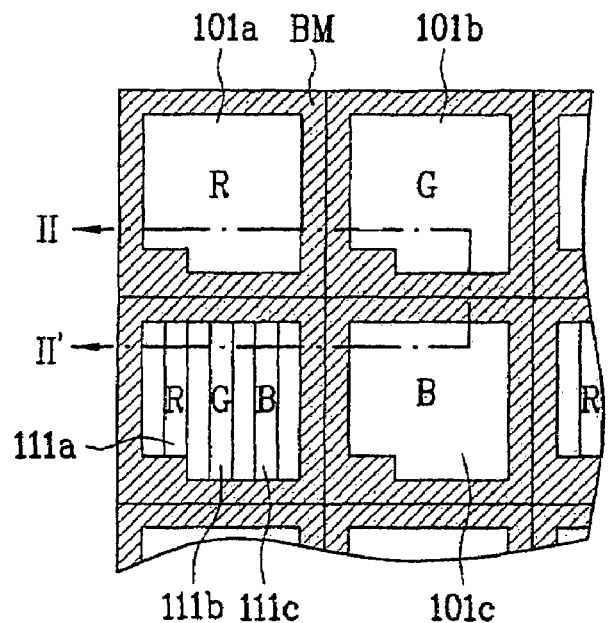
FIG. 4 is a plan view of a color filter substrate according to an embodiment of the present invention.
Figure 5:
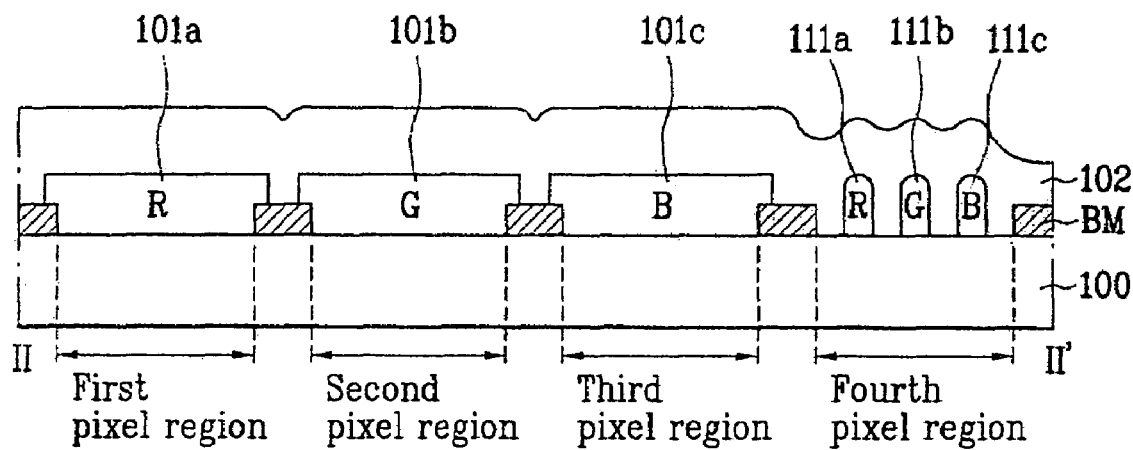
FIG. 5 is a cross sectional view of a color filter substrate along II-II' of FIG. 4.

FIG. 4 is a plan view of a color filter substrate according to an embodiment of the present invention. FIG. 5 is a cross sectional view of a color filter substrate along II-II' of FIG. 4.

As shown in FIG. 4 and FIG. 5, a color filter substrate of an LCD device according to an embodiment of the present invention includes a substrate 100, a black matrix layer BM, first to third color filter layers 101a, 101b, 101c, first to third auxiliary color filter layers 111a, 111b, 111c, and an overcoat layer 102. The first, second, third, and fourth pixel regions are repetitively formed on the substrate 100, and the black matrix layer BM is formed on an entire surface of the substrate 100 except the pixel regions to prevent light leakage on the portions other than the pixel regions. Also, the first, second, and third color filter layers 101a, 101b, 101c, are respectively formed in the first, second, and third pixel regions. The first, second, and third auxiliary color filter layers 111a, 111b, 111c are formed in the fourth pixel region to display a white color in the fourth pixel region. Then, the overcoat layer 102 is formed on the entire surface of the substrate 100 including the respective color filter layers 101a, 101b, 101c, and the respective auxiliary color filter layers 111a, 111b, 111c to simultaneously planarize the entire surface of the substrate 100 and to display the white color in the fourth pixel region.

The respective first, second, and third auxiliary color filter layers 111a, 111b, 111c formed in the fourth pixel region are narrower than the first, second, and third color filter layers 101a, 101b, 101c that correspond to the first, second, and third pixel regions. Also, the first, second, and third auxiliary color filter layers 111a, 111b, 111c, formed in the fourth pixel region, are spaced apart from one another, and the overcoat layer 102 is formed between each of the auxiliary color filter layers 111a, 111b, 111c.

Generally, the first to third color filter layers 101a, 101b, 101c, and the first to third auxiliary color filter layers 111a, 111b, 111c are respectively formed of red-dyed, green-dyed, and blue-dyed resist or resin. Accordingly, the red, green, and blue colors are obtained in the respective first, second, and third pixel regions through the first, second, and third color filter layers 101a, 101b, 101c, and the white color is obtained in the fourth pixel region by mixing the red, green, and blue colors, together.

Also, the overcoat layer 102 is formed between each of the auxiliary color filter layers 111a, 111b, 111c of the fourth pixel region, so that the light passing through the overcoat layer 102 is displayed as a white color. In the fourth pixel region, the white color obtained by the first to third auxiliary color filter layers 111a, 111b, 111c is mixed with the white color obtained by the overcoat layer 102. In this manner, the fourth pixel region of the color filter substrate according to the present invention functions as the white color filter layer for displaying the white color.

Figure 6:
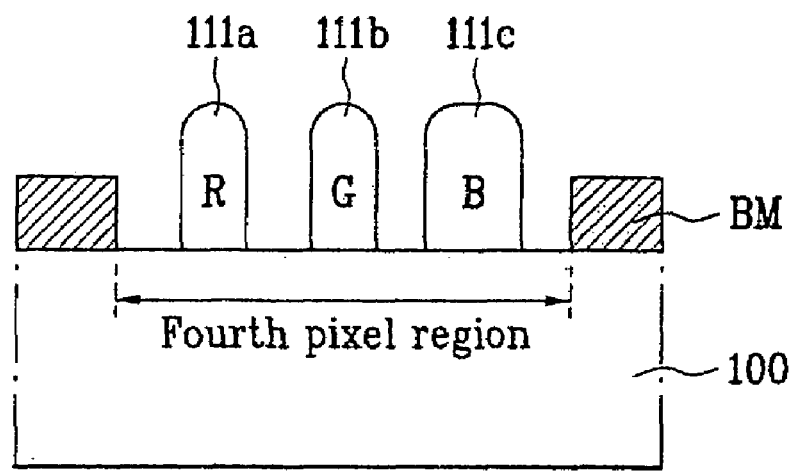
FIG. 6 is a cross sectional view of a color filter substrate having a third auxiliary color filter layer of which thickness is controlled to improve the resolution for a white color.

As shown in FIG. 6, the third auxiliary color filter layer 111c corresponding to the blue color in the fourth pixel region is wider than each of the first and second auxiliary color filter layers 111a, 111b, so that it is possible to improve the resolution for the white color obtained by mixing the colors of the first, second, and third auxiliary color filter layers 111a, 111b, 111c together.

Figure 7:
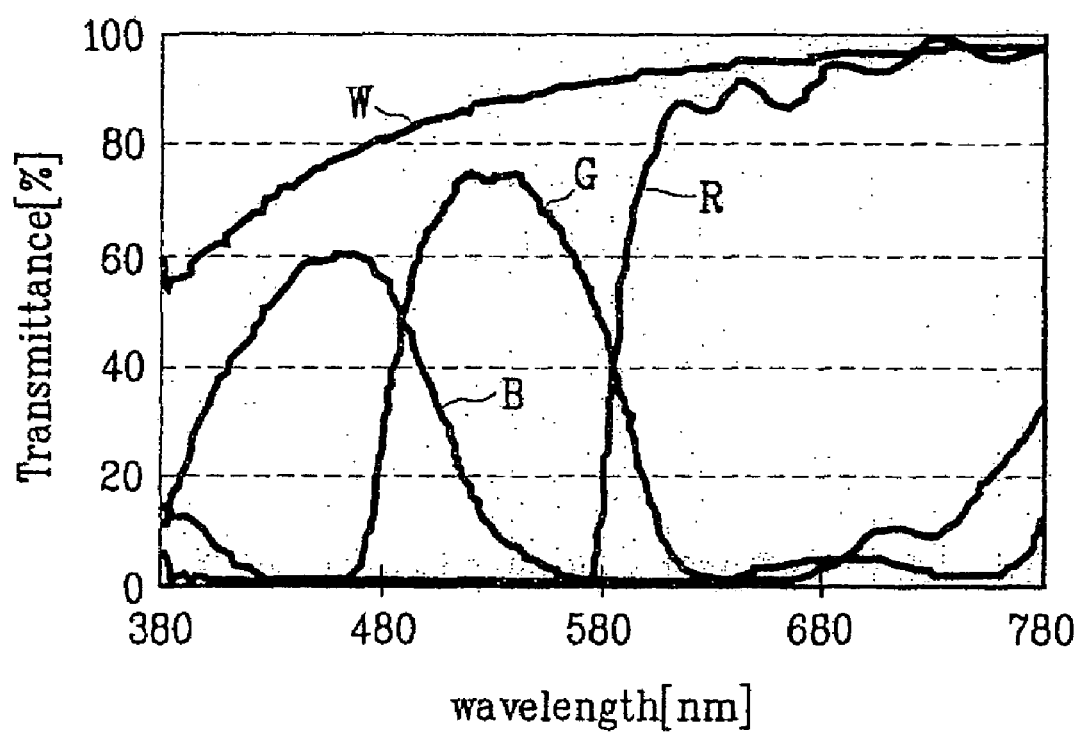
FIG. 7 is a spectrum showing the transmittance of red, green, blue, and white colors according to the light wavelength.

As shown in FIG. 7, the light passing through the overcoat layer 102 has the highest resolution for the white color. However, the light passing through the third auxiliary color filter layer 111c for the blue color has the lowest resolution among the light passing through the first, second, and third auxiliary color filter layers 111a, 111b, 111c. As a result, the white color obtained by mixing the lights passing through the first, second, and third auxiliary color filter layers 111a, 111b, 111c has a lower resolution than the white color obtained by the overcoat layer.

Thus, as the third auxiliary color filter layer 111c for the blue color is wider than each of the first and second auxiliary color filter layers 111a, 111b, more light passes through the third auxiliary color filter layer 111c. That is, the transmittance of the blue (B) color increases, whereby the peak of transmittance for the blue color, passing through the third auxiliary color filter layer 111c, becomes closer to the transmittance of the white color passing through the overcoat layer 102. As a result, the white color obtained by mixing the light passing through the first, second, and third auxiliary color filter layers 111a, 111b, 111c is similar in the resolution to the white color obtained by the overcoat layer 102.

In the related art color filter substrate, the pixel regions are formed in the constant size, and the respective color filter layers 101a, 101b, 101c corresponding to the pixel regions are formed in the constant size, so that it is difficult to improve the resolution for the white color. In the color filter substrate according to the present invention, it is possible to control the size of the auxiliary color filter layers 111a, 111b, 111c formed in the fourth pixel region, especially, the third auxiliary color filter layer 111c, thereby improving the resolution for the white color.

A method for fabricating the color filter substrate of the LCD device according to the present invention will be described as follows. FIG. 8A to FIG. 8E are cross sectional views of the fabrication process of a color filter substrate along II-II' of FIG. 4.

Figure 8A:
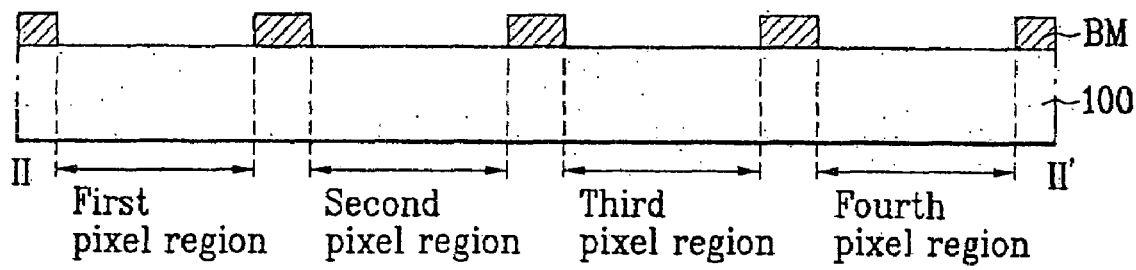
FIG. 8A to FIG. 8E are cross sectional views of the fabrication process of a color filter substrate along II-II' of FIG. 4.

First, as shown in FIG. 8A, after preparing the substrate 100 having the first to fourth pixel regions repetitively arranged, the chrome or resin is deposited on the substrate 100, and then patterned by photolithography. As a result, the black matrix layer BM is formed on the entire surface of the substrate 100 except the respective pixel regions.

Figure 8B:
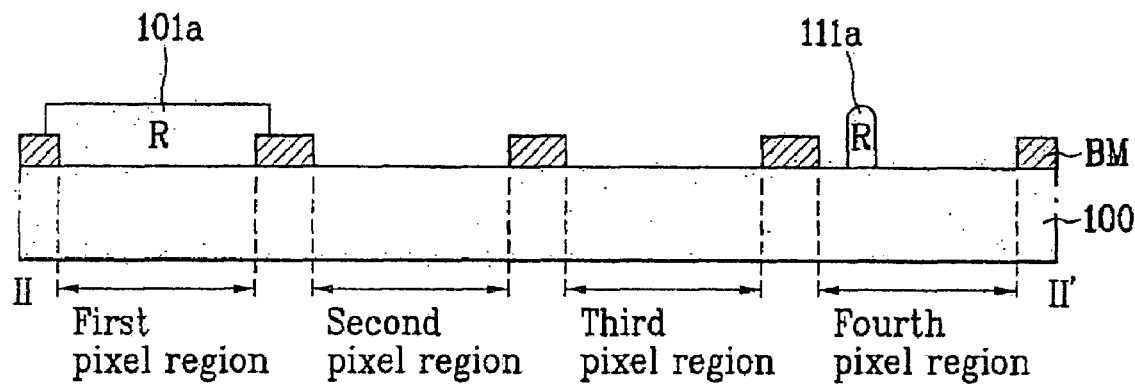

Subsequently, as shown in FIG. 8B, a red resist or resin is coated on the substrate 100 having the black matrix layer BM, and then the substrate 100 coated with the red resist or resin is patterned by photolithography to form the first color filter layer 101a on the first pixel region of the substrate 100, and the first auxiliary color filter layer 111a on a predetermined portion of the fourth pixel region, simultaneously. At this time, the first auxiliary color filter layer 111a of the fourth pixel region is narrower than the first color filter layer 101a of the first pixel region.

Figure 8C:
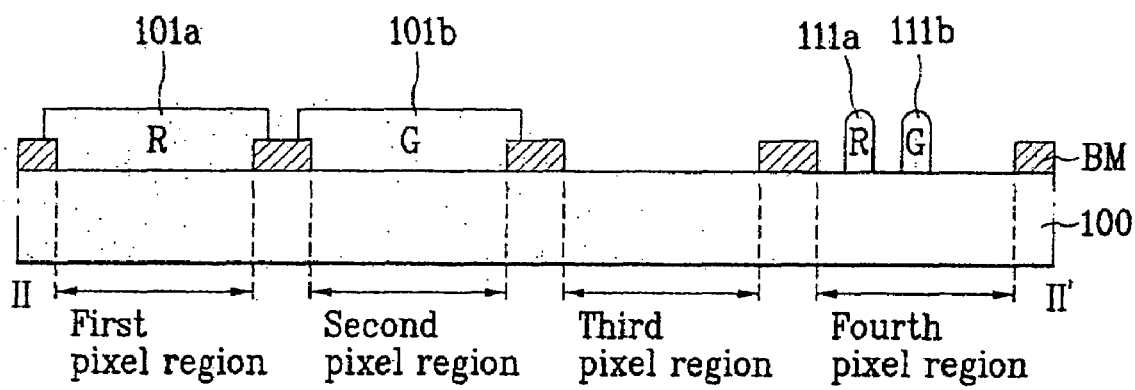

Next, as shown in FIG. 8C, a green resist or resin is coated on the substrate 100 having the first color filter layer 101a, and then patterned by photolithography, thereby forming the second color filter layer 101b on the second pixel region of the substrate 100, and the second auxiliary color filter layer 111b on a predetermined portion of the fourth pixel region, simultaneously. At this time, the second auxiliary color filter layer 111b of the fourth pixel region is narrower than the second color filter layer 101b of the second pixel region. Also, the second auxiliary color filter layer 111b is spaced apart from the first auxiliary color filter layer 111a.

Figure 8D:
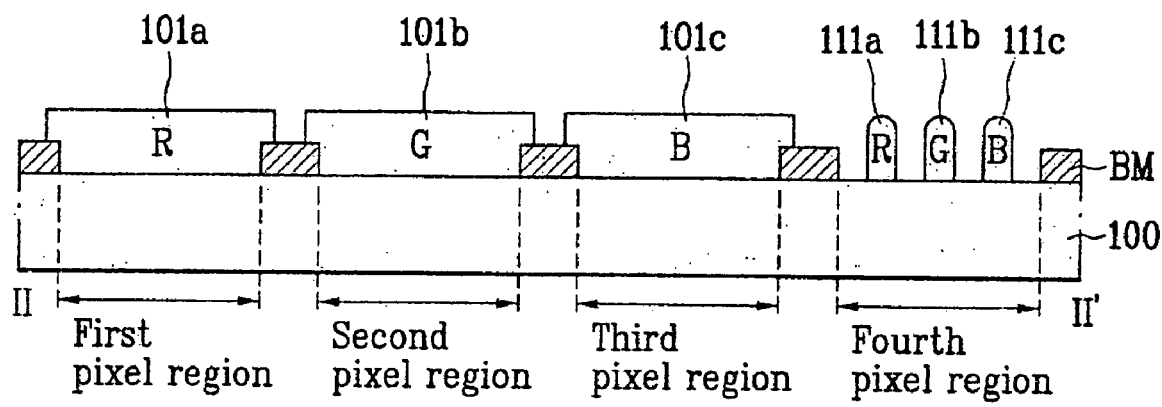

After that, as shown in FIG. 8D, a blue resist or resin is coated on the substrate 100 having the first and second color filter layers 101a, 101b and the first and second auxiliary color filter layers 111a, 111b, and then patterned by photolithography, thereby forming the third color filter layer 101c on the third pixel region of the substrate 100, and the third auxiliary color filter layer 111c on a predetermined portion of the fourth pixel region, simultaneously. At this time, the third auxiliary color filter layer 111c of the fourth pixel region is narrower than the third color filter layer 101c of the third pixel region. Also, the third auxiliary color filter layer 111c is spaced apart from the first and second auxiliary color filter layers 111a and 111b.

The resolution for the white color, as described above, the third auxiliary color filter layer 111c of the fourth pixel region is wider than each of the first and second auxiliary color filter layers 111a, 111b of the fourth pixel region.

Figure 8E:
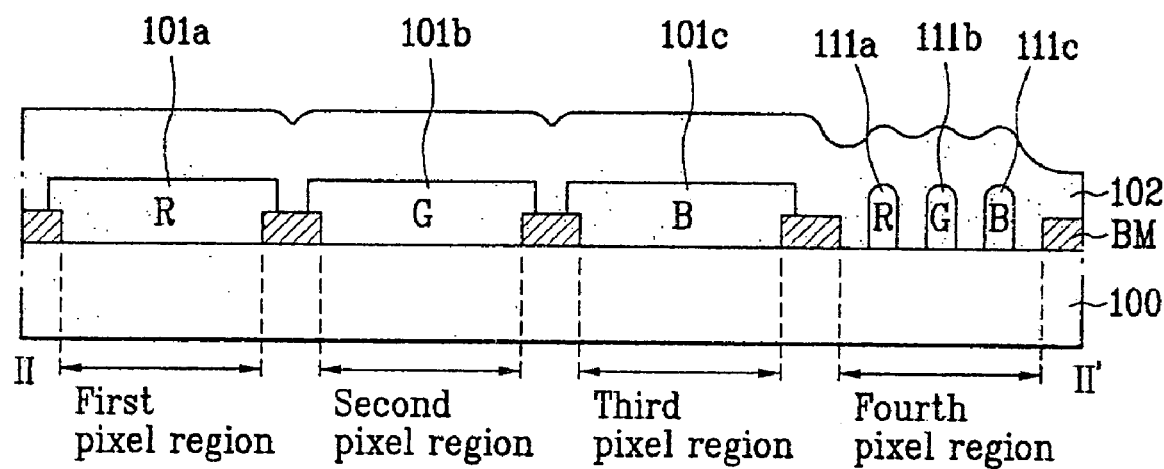

Subsequently, as shown in FIG. 8E, the overcoat layer 102 is formed on the entire surface of the substrate 100 including the first to third color filter layers 101a, 101b, 101c, and the first to third auxiliary color filter layers 111a, 111b, 111c, to planarize the step coverage between the color filter layers 101a, 101b, 101c and the auxiliary color filter layers 111a, 111b, 111c.

The first, second, and third auxiliary color filter layers 111a, 111b, 111c of the fourth pixel region are spaced apart from one another, and the overcoat layer 102 is formed between each of the auxiliary color filter layers 111a, 111b, 111c. Thus, in order to obtain the white color in the fourth pixel region, it is required to form the first, second, and third auxiliary color filter layers 111a, 111b, 111c, and the overcoat layer 102.

Based upon the fabrication process of the color filter substrate of the present invention, it is possible to form a color filter layer having improved resolution for the white color in the fourth pixel region without the need for additional fabrication process steps.

An IPS mode LCD device using the color filter substrate according to the present invention will be described as follows.

Figure 9:
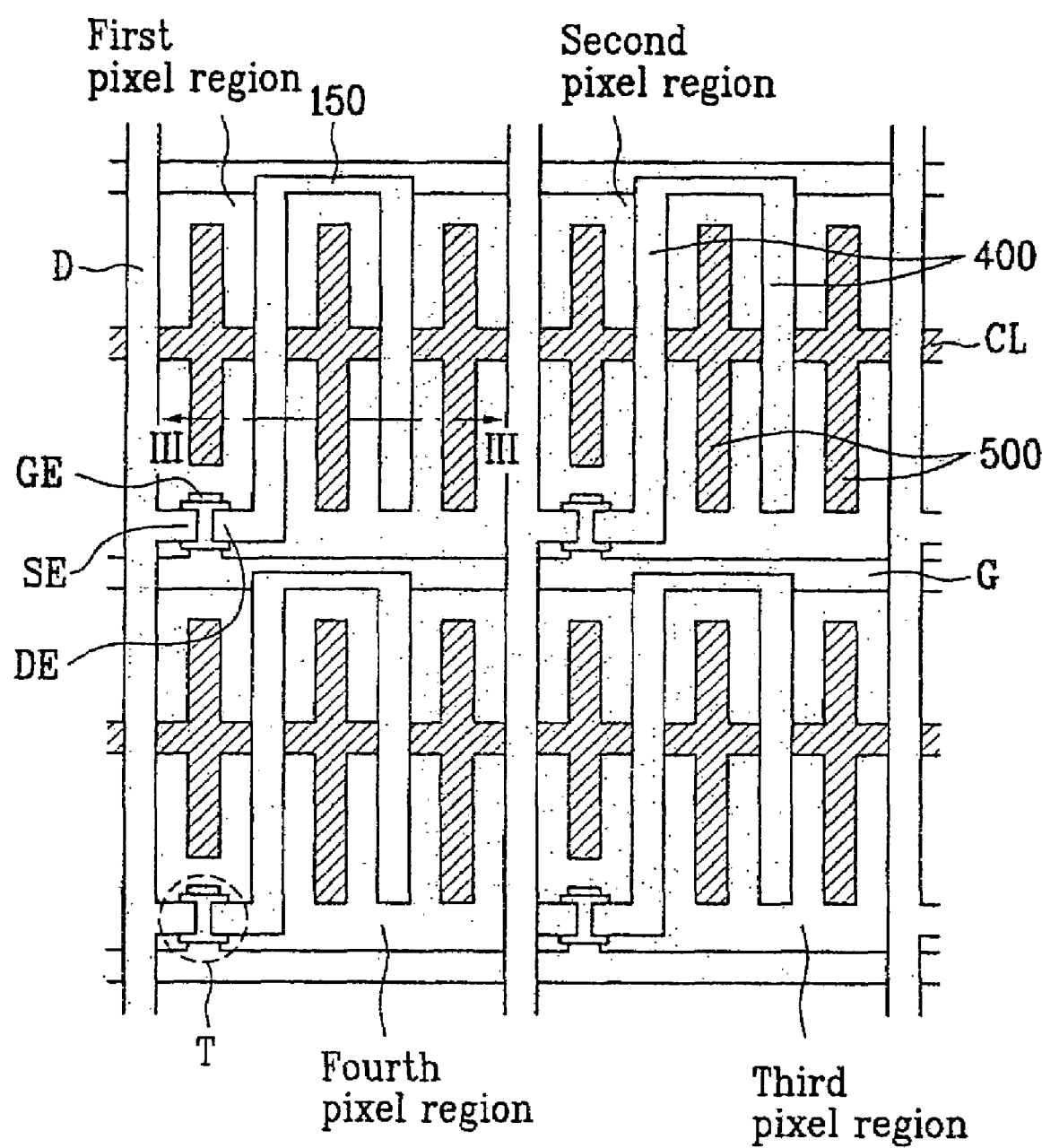
FIG. 9 is a schematic view of four pixel regions of a first substrate in an IPS mode LCD device according to an embodiment of the present invention.
Figure 10:
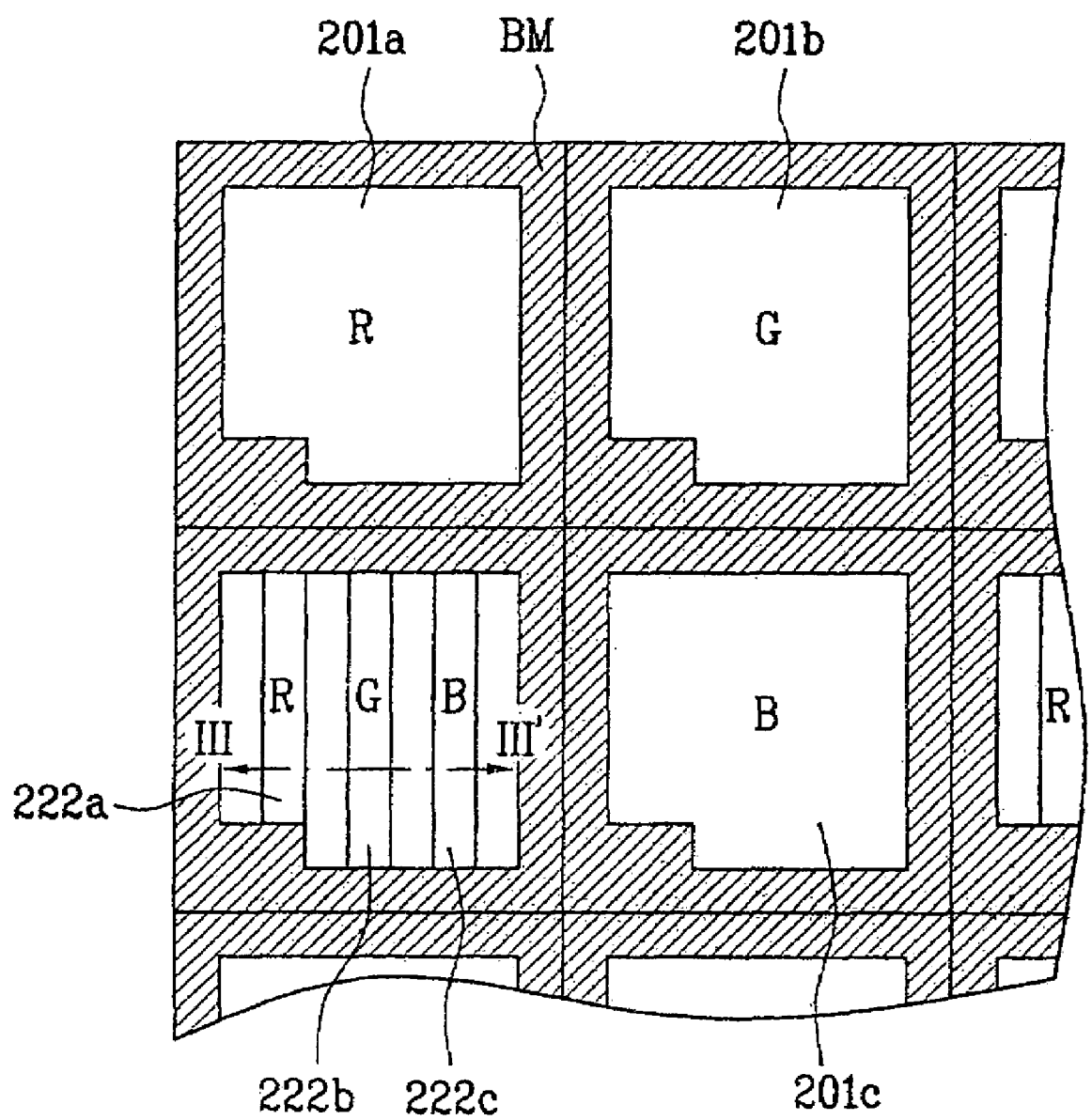
FIG. 10 is a schematic view of respective color filter layers and auxiliary color filter layers formed on a second substrate, wherein the respective color filter layers are formed to correspond with respective pixel regions of a first substrate of FIG. 9.
Figure 11:
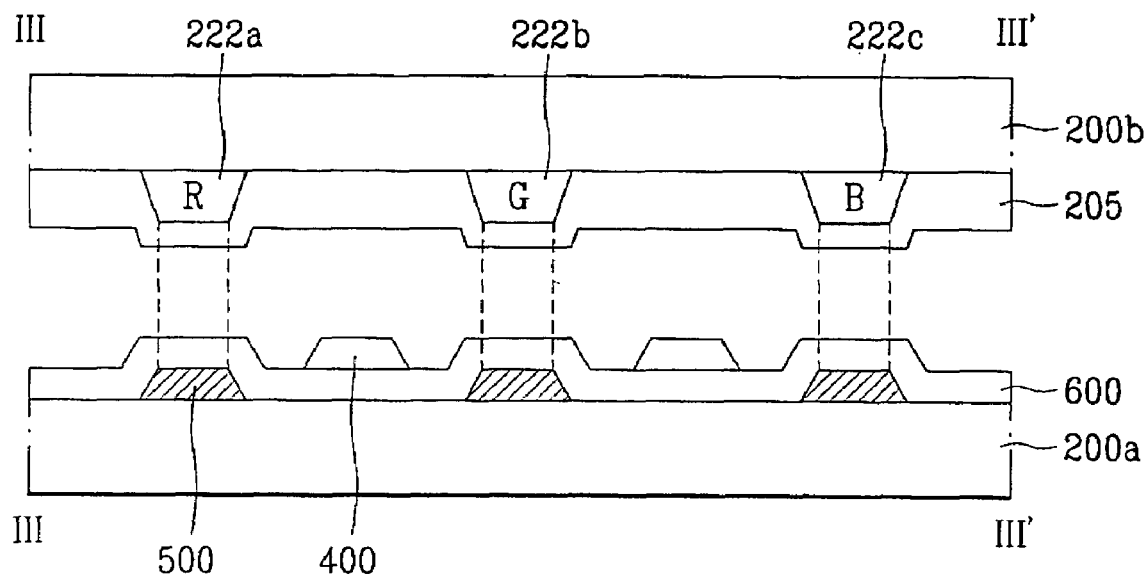
FIG. 11 is a cross sectional view of an IPS mode LCD device along III-III' of FIG. 10.

FIG. 9 is a schematic view of four pixel regions of a first substrate in an IPS mode LCD device according to an embodiment of the present invention. FIG. 10 is a schematic view of respective color filter layers and auxiliary color filter layers formed on a second substrate, wherein the respective color filter layers correspond to respective pixel regions of a first substrate of FIG. 9. FIG. 11 is a cross sectional view of an IPS mode LCD device along III-III' of FIG. 10.

As shown in FIG. 9 and FIG. 10, an IPS mode LCD device according to an embodiment of the present invention includes first and second substrates 200a and 200b facing each other, pixel and common electrodes 400 and 500, a black matrix layer BM, first to third color filter layers 201a, 201b, 201c, first to third auxiliary color filter layers 222a, 222b, 222c, and an overcoat layer 205. At this time, first, second, third and fourth pixel regions are repetitively formed on the first and second substrates 200a and 200b. Also, the pixel and common electrodes 400 and 500 are formed substantially in parallel within the respective pixel regions of the first substrate 200a. The black matrix layer BM is formed on an entire surface of the second substrate 200b except the pixel regions, to prevent light leakage on the portions other than the pixel regions. Then, the respective first, second, and third color filter layers 201a, 201b, 201c, are formed on the first, second, and third pixel regions of the second substrate 200b. The first, second, and third auxiliary color filter layers 222a, 222b, 222c are formed on the fourth pixel region to display the white color in the fourth pixel region. Also, the overcoat layer 205 is formed on the entire surface of the second substrate 200b including the respective color filter layers 201a, 201b, 201c, and the respective auxiliary color filter layers 222a, 222b, 222c.

More specifically, as shown in FIG. 9, the first substrate 200a includes a plurality of gate lines G, a plurality of data lines D, a thin film transistor T, a common line CL, the plurality of common electrodes 500, the plurality of pixel electrodes 400, and a storage electrode 150. That is, the plurality of gate lines G are formed substantially in perpendicular to the plurality of data lines D to define the pixel regions. Also, the thin film transistor T is formed at a crossing portion of the gate G and data D lines, and the common line CL is formed substantially in parallel to the gate line G within the pixel region. Then, the plurality of common electrodes 500, extending from the common line CL, are formed substantially in parallel to the data line D. The plurality of pixel electrodes 400 extend from a drain electrode DE of the thin film transistor T, and each of the pixel electrodes 400 is formed between the common electrodes 500, substantially in parallel. Then, the storage electrode 150 extends from the pixel electrode 400, wherein the storage electrode 150 is formed on the gate line G.

Herein, a non-explained reference 'SE' is a source electrode, and a non-explained reference 'GE' is a gate electrode.

The second substrate 200b, opposite to the first substrate 200a, will be described in detail.

That is, as shown in FIG. 10, in the fourth pixel region of the second substrate 200b, the first, second, and third auxiliary color filter layers 222a, 222b, 222c are formed in one region. Also, the respective first, second, and third auxiliary color filter layers 222a, 222b, 222c are narrower than the first, second, and third color filter layers 201a, 201b, 201c formed to correspond with the first, second, and third pixel regions, respectively.

Also the first, second, and third auxiliary color filter layers 222a, 222b, 222c of the fourth pixel region are spaced apart from one another, and the overcoat layer 205 is formed between each of the auxiliary color filter layers 222a, 222b, 222c.

Generally, the first to third color filter layers 201a, 201b, 201c, and the first to third auxiliary color filter layers 222a, 222b, 222c are respectively formed of red-dyed, green-dyed, and blue-dyed resist or resin. Thus, the red, green, and blue colors are obtained in the respective first, second, and third pixel regions through the first, second, and third color filter layers 201a, 201b, 201c, and the white color is obtained in the fourth pixel region by mixing the red, green, and blue colors, together.

Also, the overcoat layer 205 is formed between each of the auxiliary color filter layers 222a, 222b, 222c of the fourth pixel region, so that the light passing through the overcoat layer 205 is displayed as the white color. In the fourth pixel region, the white color obtained by the first to third auxiliary color filter layers 222a, 222b, 222c is mixed with the white color obtained by the overcoat layer 205. In this manner, the fourth pixel region of the IPS mode LCD device according to the present invention functions as the white color filter layer for displaying the white color.

Meanwhile, as described above, the third auxiliary color filter layer 222c corresponding to the blue color in the fourth pixel region is wider than each of the first and second auxiliary color filter layers 222a and 222b, so that it is possible to improve the resolution for the white color obtained by mixing the colors of the first, second, and third auxiliary color filter layers 222a, 222b, 222c together.

As shown in FIG. 11, the first, second, and third auxiliary color filter layers 222a, 222b, 222c, formed on the fourth pixel region of the second substrate 200b, are formed to correspond with the common electrodes 500 of the first substrate 200a. That is, supposing that the common electrodes 500, arranged from the left side to the right side of FIG. 11, are referred to as the first, second, and third common electrodes in order, the first auxiliary color filter layer 222a of the fourth pixel region corresponds to the first common electrode, the second auxiliary color filter layer 222b corresponds to the second common electrode, and the third auxiliary color filter layer 222c corresponds to the third common electrode.

If one or two common electrodes 500 are formed on the fourth pixel region of the first substrate 200a, the respective auxiliary color filter layers 222a, 222b, 222c of the fourth pixel region may be divided and formed to correspond to the common electrodes 500.

Figure 12:
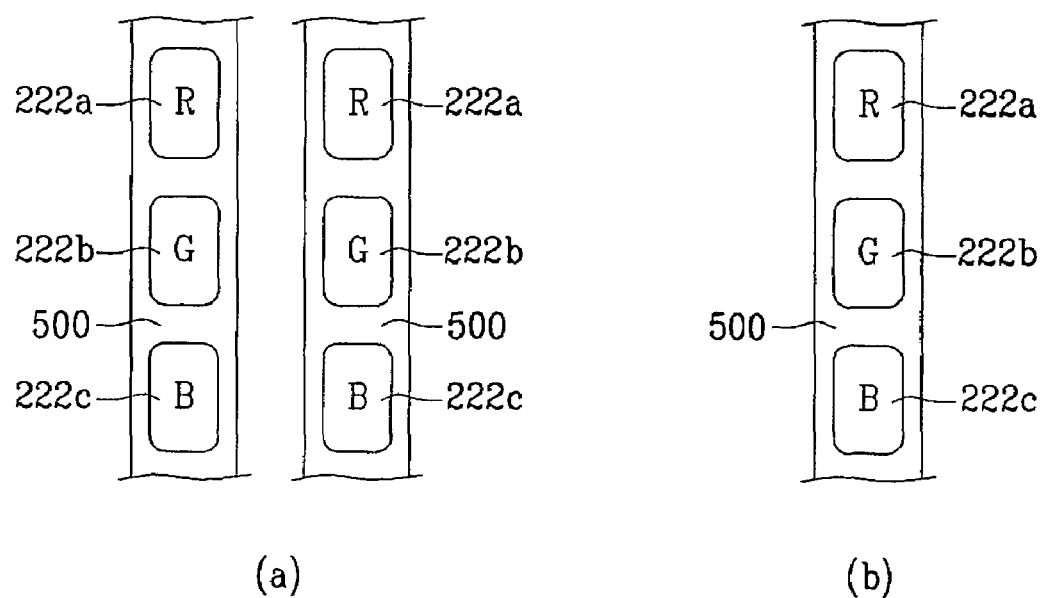
FIG. 12 is a plan view of a common electrode and an auxiliary color filter layer, showing the correlation between the common electrode and respective auxiliary color filter layers formed in a fourth pixel region.

FIG. 12 is a plan view showing the correlation between the common electrode and the auxiliary color filter layer.

That is, as shown in (a) of FIG. 12, when two electrodes 500, referred to as the first and second common electrodes, respectively, the first, second, and third auxiliary color filter layers 222a, 222b, 222c may be correspondent to three parts formed by dividing the first common electrode into three, and the other first, second, and third auxiliary color filter layers 222a, 222b, 222c may be correspondent to three parts formed by dividing the second common electrode into three.

As shown in (b) of FIG. 12, if one common electrode 500 is formed, the common electrode may be divided into three parts, and the first, second, and third auxiliary color filter layers 222a, 222b, 222c may be formed to correspond with the respective three parts.

In this case, the first, second, and third auxiliary color filter layers 222a, 222b, 222c, formed in the fourth pixel region, correspond to the common electrodes 500 to prevent the aperture ratio for the white color, obtained by the overcoat layer 205 of the fourth pixel region, from being decreased due to the auxiliary color filter layers 222a, 222b, 222c.

Figure 13A:
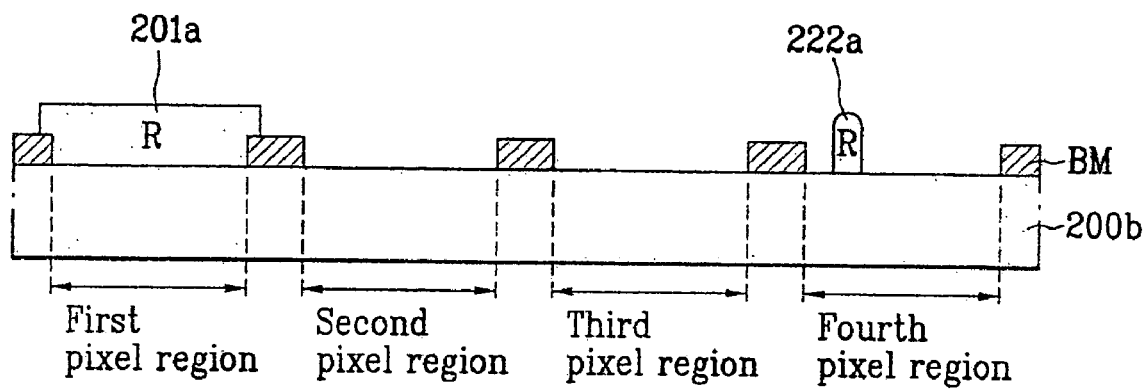
FIG. 13A to FIG. 13C are cross sectional views of the fabrication process of an IPS mode LCD device according to an embodiment of the present invention.
Figure 13B:
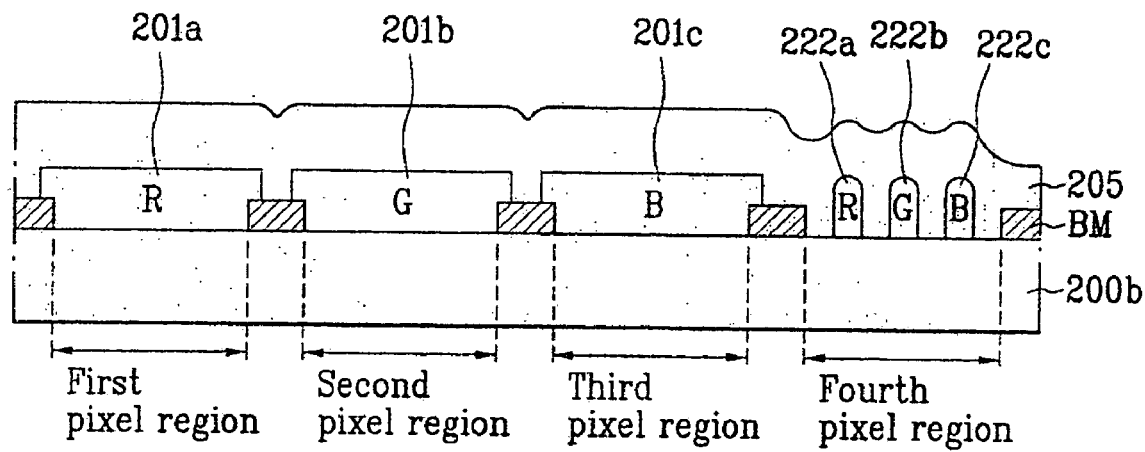
Figure 13C:
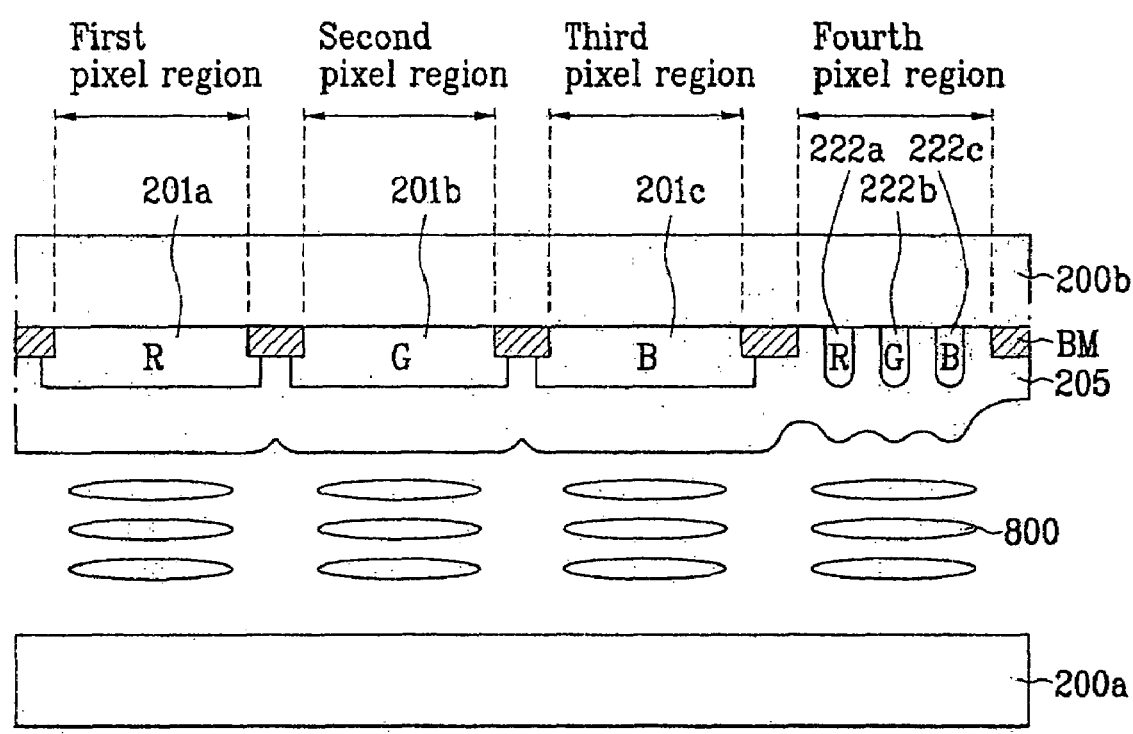

A method for fabricating the IPS mode LCD device according to another embodiment of the present invention will be described as follows. FIG. 13A to FIG. 13C are cross sectional views of the fabrication process of the IPS mode LCD device according to the embodiment of the present invention.

First, the second substrate 200b, having the first, second, third, and fourth pixel regions repetitively arranged, is prepared. At this time, the second substrate 200b is explained with reference to FIG. 9 and FIG. 11. For convenience of the explanation, the common electrodes 500, arranged from the left side to the right side of FIG. 11, are referred to as the first, second, and third common electrodes, in order.

That is, as described above, the first substrate 200a includes the plurality of gate lines G, the plurality of data lines D, the thin film transistor T, the common line CL, the plurality of common electrodes 500, the pixel electrode 400, and the storage electrode 150. At this time, the plurality of gate lines G are formed substantially in perpendicular to the plurality of data lines D to define the pixel regions. Also, the thin film transistor T is formed at the crossing portion of the gate G and data D lines, and the common line CL is formed substantially in parallel to the gate lines G, within the pixel region. Then, the plurality of common electrodes 500, extending from the common line CL, are formed substantially in parallel to the data lines D. The pixel electrodes 400 extend from the drain electrode DE of the thin film transistor T, and each of the pixel electrodes 400 is formed between the common electrodes 500, substantially in parallel. Also, the storage electrode 150 extends from the pixel electrode 400, wherein the storage electrode 150 is formed on the gate line G.

Subsequently, as shown in FIG. 13A, after preparing the second substrate 200b having the first, second, third, and fourth pixel regions repetitively arranged to correspond with the first substrate 200a, chrome or resin is deposited on the second substrate 200b, and then patterned by photolithography, thereby forming the black matrix layer BM on the entire surface of the second substrate 200b except the pixel regions.

After that, a red resist or resin is coated on the second substrate 200b having the black matrix layer BM, and then the second substrate 200b coated with the red resist or resin is patterned by photolithography, thereby forming the first color filter layer 201a on the first pixel region of the second substrate 200b, and the first auxiliary color filter layer 222a on a predetermined portion of the fourth pixel region, simultaneously. At this time, the first auxiliary color filter layer 222a of the fourth pixel region is narrower than the first color filter layer 201a of the first pixel region. Also, the first auxiliary color filter layer 222a is formed to correspond with the first common electrode 500 of the fourth pixel region of the first substrate 200a.

Next, as shown in FIG. 13B, a green resist or resin is coated on the second substrate 200b having the first color filter layer 201a, and then the second substrate 200b is patterned by photolithography, thereby forming the second color filter layer 201b on the second pixel region of the second substrate 200b, and the second auxiliary color filter layer 222b on a predetermined portion of the fourth pixel region, simultaneously. At this time, the second auxiliary color filter layer 222b of the fourth pixel region is narrower than the second color filter layer 201b of the second pixel region. Also, the second auxiliary color filter layer 222b is formed to correspond to the second common electrode 500 of the fourth pixel region of the first substrate 200a.

Then, a blue resist or resin is coated on the second substrate 200b having the first and second color filter layers 201a and 201b, and then the second substrate 200b is patterned by photolithography, thereby forming the third color filter layer 201c on the third pixel region of the second substrate 200b, and the third auxiliary color filter layer 222c on a predetermined portion of the fourth pixel region, simultaneously. At this time, the third auxiliary color filter layer 222c of the fourth pixel region is narrower than the third color filter layer 201c of the third pixel region. Also, the third auxiliary color filter layer 222c is formed to correspond with the third common electrode 500 of the fourth pixel region of the first substrate 200a.

Herein, the third auxiliary color filter layer 222c of the fourth pixel region may be wider than each of the first and second auxiliary color filter layers 222a and 222b of the fourth pixel region. The third auxiliary color filter layer 222c may be wider than the third common electrode 500, as described above, to improve the resolution for the white color.

Subsequently, the overcoat layer 205 is formed on the entire surface of the second substrate 200b including the first, second, and third color filter layers 201a, 201b, 201c, and the first, second, and third auxiliary color filter layers 222a, 222b, 222c, so that it is possible to planarize the step coverage between each of the color filter layers 201a, 201b, 201c and each of the auxiliary color filter layers 222a, 222b, 222c.

At this time, the first, second, and third auxiliary color filter layers 222a, 222b, 222c, formed in the fourth pixel region, are spaced apart from one another, and the overcoat layer 205 is formed between each of the auxiliary color filter layers 222a, 222b, 222c.

Accordingly, the first, second, and third auxiliary color filter layers 222a, 222b, 222c and the overcoat layer 205 are formed to obtain the white color in the fourth pixel region.

After that, as shown in FIG. 13C, a liquid crystal layer 800 is formed between the first substrate 200a and the second substrate 200b, thereby completing the fabrication process of the IPS mode LCD device.

At this time, the liquid crystal layer 800 may be formed in a method of injecting liquid crystal between the first and second substrates 200a and 200b after bonding the first and second substrates 200a and 200b to each other, or in a method of bonding the first and second substrates 200a and 200b to each other after dispensing liquid crystal on any one of the first and second substrates 200a and 200b.

In the fabrication process of the IPS mode LCD device according to the present invention, it is possible to form the color filter layer having improved resolution for the white color in the fourth pixel region by the first, second, and third auxiliary color filter layers 222a, without the need for an additional fabrication process step. Also, the respective auxiliary color filter layers 222a, 222b, 222c are formed to correspond with the common electrodes 500, thereby improving the aperture ratio.

As described above, the IPS mode LCD device and the method for fabricating the same have the following advantages.

First, it is possible to form the auxiliary color filter layer for displaying the white color without an additional fabrication process step, thereby decreasing fabrication time.

Also, it is easy to control the width of the respective color filter layers formed in the same pixel region, thereby improving the resolution for the white color obtained by mixing the light passing through the respective auxiliary color filter layers and the respective color filter layers.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device, comprising:

first and second substrates having first, second, third and fourth pixel regions arranged repetitively, wherein common and pixel electrodes are formed substantially parallel to each other in each pixel region on the first substrate;

a black matrix layer formed on the second substrate corresponding to portions other than the pixel regions;

first, second and third color filter layers respectively formed on the first, second, and third pixel regions of the second substrate;

first, second, and third auxiliary color filter layers formed on the fourth pixel region of the second substrate to display a white color, wherein respective first, second, and third auxiliary color filter layers are formed to correspond with the common electrodes of the first substrate so that the common electrodes cover first, second, and third auxiliary color filter layers completely; and a liquid crystal layer formed between the first and second substrates.

2. The LCD device of claim 1, wherein the first, second, and third color filter layers are respectively formed of red-dyed, green-dyed, and blue-dyed resist or resin, and the first, second, and third auxiliary color filter layers are respectively formed of red-dyed, green-dyed, and blue-dyed resist or resin.

3. The LCD device of claim 1, further comprising an overcoat layer on an entire surface of the second substrate including the color filter layers and the auxiliary color filter layers.

4. The LCD device of claim 1, wherein each of the first, second, and third auxiliary color filter layers is narrower than each of the first, second, and third color filter layers.

5. The LCD device of claim 1, wherein the first, second, and third auxiliary color filter layers are spaced apart from one another.

6. The LCD device of claim 1, wherein the third auxiliary color filter layer is wider than each of the first and second auxiliary color filter layers.

7. The LCD device of claim 1, wherein the first substrate includes a gate line, a data line substantially perpendicular to the gate line, and a thin film transistor formed at a crossing portion of the gate and data lines.

8. The LCD device of claim 1, wherein the respective first, second, and third auxiliary color filter layers correspond to three parts formed by dividing the common electrode of the first substrate.

* * * * *